July 29, 1924.

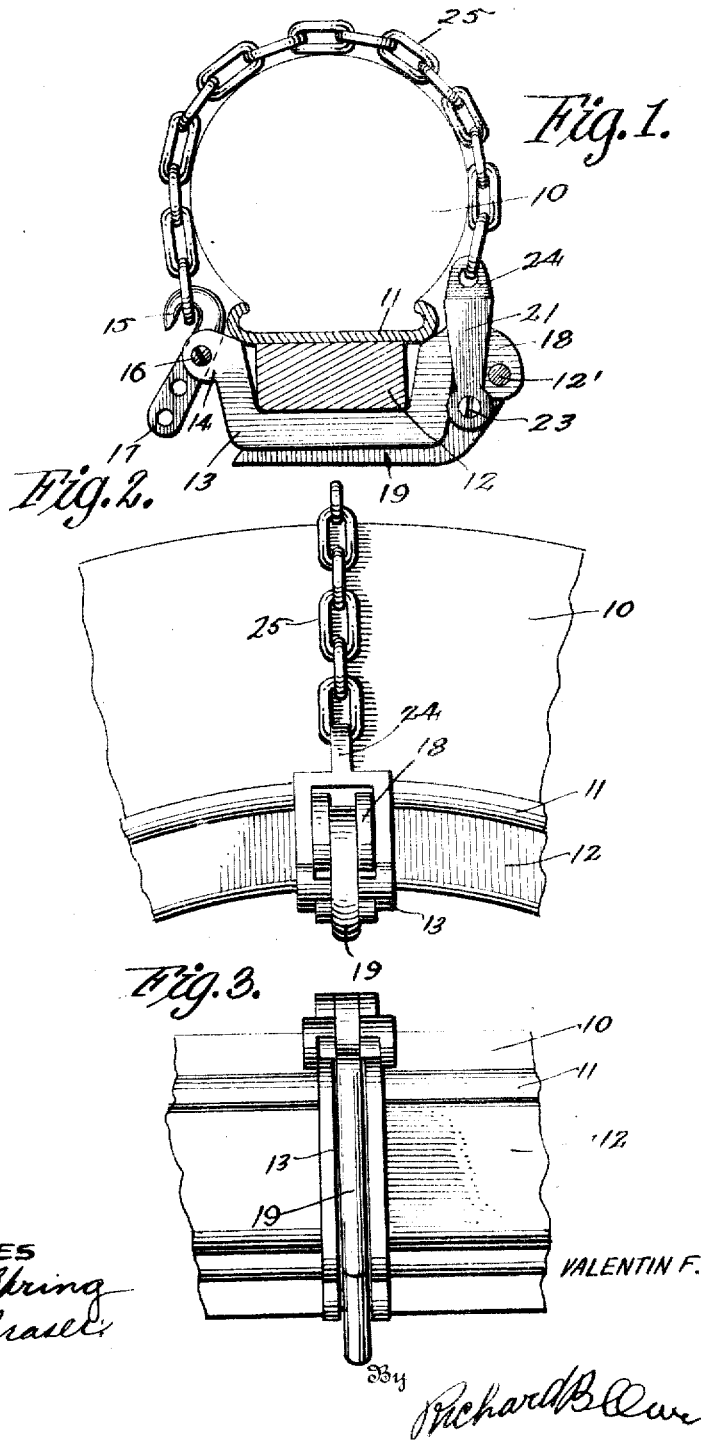

V. F. REJCEK

ANTISKID DEVICE

Filed April 30, 1923

1,502,878

2 Sheets-Sheet 2

WITNESSES
Guy M Spring
Frank Fraser

Inventor
VALENTIN F. REJČEK

By Richard B Owen, Attorney

Patented July 29, 1924.

1,502,878

UNITED STATES PATENT OFFICE.

VALENTIN F. REJČEK, OF PENELOPE, TEXAS.

ANTISKID DEVICE.

Application filed April 30, 1923. Serial No. 635,789.

*To all whom it may concern:*

Be it known that I, VALENTIN F. REJČEK, a citizen of the United States, residing at Penelope, in the county of Hill and State of Texas, have invented certain new and useful Improvements in an Antiskid Device, of which the following is a specification.

The present invention relates to an anti skid device and has particular reference to an anti skid device that is particularly adapted for use on all types of automobiles, including both pleasure cars and trucks, using either pneumatic or solid rubber tires.

An object of the invention is to provide an anti-skid device of this class, that depends neither upon bolts or screws, for its locking medium, nor does it use the unsatisfactory snap catch, but on the other hand is provided with a positive locking means whereby when the chain is put in place all possibility of accidental displacement is obviated.

A further object of the invention is to provide an anti skid device of this class, that can be put in place or removed therefrom with ease, and which when in place will greatly enhance the traction of the vehicle to which it is applied.

Another important object of the invention is to provide an anti skid device that is except all strong, durable, comparatively simple and inexpensive in construction, and which is especially well adapted to the uses for which it is designed.

Other objects and advantages of the invention will become apparent during the course of the following description.

Figure 4:
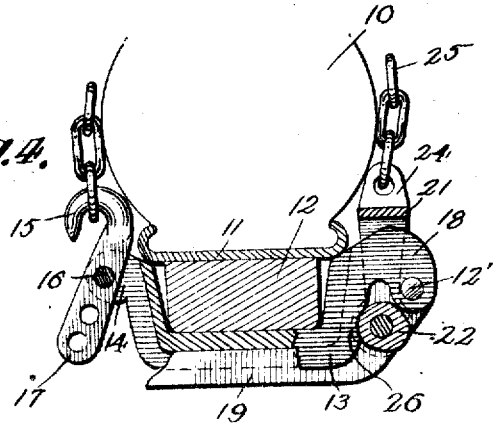
Figure 5:
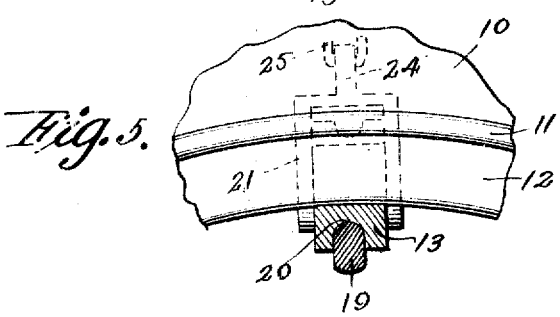
Figure 6:
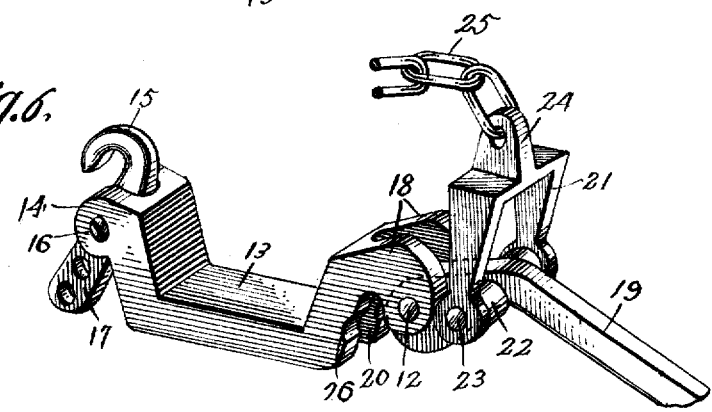

In the drawings, wherein like numerals are employed to designate like parts throughout the same, Figure 1 is a front elevation of the invention illustrating a pneumatic tire and felly therefor in section, Figure 2 is a side elevation thereof, Figure 3 is a bottom plan view of the device applied, Figure 4 is a front plan view partly in section for the purpose of illustration, Figure 5 is a fragmentary transverse section, and Figure 6 is a detail perspective of the invention.

In the drawings, wherein for the purpose of illustration is shown the preferred embodiment of my invention, the numeral 10 designates any form of automobile or truck tire, being carried by the usual rim 11 mounted on a felly 12.

The present invention comprises a saddle strap 13, which fits on the felly 12 as is clearly illustrated in the drawings. The saddle strap 13 terminates at one end in the spaced ears 14, so as to receive a hook 15 which is pivotally mounted therebetween by means of the removable bolt 16. The hook 15 is provided with the apertured shank 17 so as to allow for adjustment of the hook relative to the ears 14.

The opposite end of the saddle strap terminates in the spaced parallel ears 18, which extend downwardly as is clearly shown so as to allow the pivotal mounting of a cam operating lever 19 between the ears near their lowermost ends. As can be seen by an inspection of the drawings, the saddle strap 13 has a groove 20 formed along its lower faces, so that the shank 17 may be received in its respective end, and the cam operating lever 19 may be swung around so as to be received within the groove as shown in figure 4 of the drawings.

The cam operating lever 19 is bent slightly, at a point nearest its pivoted end, so that the longer portion thereof will lie flat in the groove 20 when in such a position. A yoke 21, having cams 22 carried by the open end of the yoke and on the inside thereof, is pivotally mounted to the cam operating lever 19 by means of a bolt 23 passing therethrough. An upstanding ear 24 is made integral with the yoke 21, and is adapted for reception of a link of the chain 25, while the opposite end link of the chain is engaged by the hook 15. It will of course be understood that the yoke 21 is pivotally mounted on the cam operating lever 19 at such a point that the operating lever will be free to swing without the cam 22 or the yoke 21 striking the lower end of the ears 18 so as to interfere therewith.

The strap 13 is provided with the curved cut-out portions 26 in such a place that the cams 22 will be received therein when the device is placed in an operative position.

In use, the chain 25 is disengaged from the hook 15, and the saddle strap 13 is placed upon the felly 12 of the wheel as is clearly shown in Figure 4 of the drawings. The cam lever 19 is then swung from its seat in the saddle strap to a position approximately as shown in Figure 6, whereby the chain 25 is passed around the tire 10 to the opposite side thereof, whereby one of the links may be engaged with the hook 15. Of course, the hook 15 may be adjusted to any of the apertures formed in the shank 17, depending upon the size of the tire and the length of the chain used. When the link of the chain has been hooked in position, the lever 19 is moved to its seat, thereby causing the chain 25 to become tight. As the cam operating lever 19 is moved it will be seen that the pivot point 23 is lowered and moved to one side of the pivot point 12'. When the lever 19 has been seated in the groove, the cam 22 will assume the position shown in Figure 4 of the drawings, and the device will be effectively locked so that it will be impossible for any of the portions thereof to become accidently displaced.

When it is desired to remove the device from the tire, the yoke 21 is swung away from the tire which will cause the turning of the cams 22 and the bringing of the enlarged portions thereof in contact with the channel strap and thus cause the operating lever 19 to move outward slightly, so that the operator may easily grasp the same and swing it into the position shown in Figure 6, whereby the entire device may be removed. It will of course be understood that as many of these devices may be applied to a wheel as is desired, depending upon the use to which it is put.

It is to be further understood, that the form of the invention herewith shown and described is to be taken as the preferred embodiment of the same, and that various changes in the shape, size and arrangement of parts may be resorted to without departing from the spirit of the invention or the scope of the subjoined claims.

Having thus described my invention, what I claim as new is:—

1. An anti-skid device comprising a saddle strap, a hook mounted at one end thereof, a pivoted cam locking lever associated with the other end thereof, a pivoted yoke carried by the locking lever, and a chain connected between the yoke and the hook.

2. An anti-skid device comprising a saddle strap, a hook associated with one end thereof, a pair of hook-shaped pivot ears formed on the opposite end thereof, a bent lever pivoted at its inner end between the bills of the hook-shaped pivot ears, a yoke pivoted to the lever at its angle, and traction means connected between said hook and said yoke, the bent portion of the lever being adapted to lie below the hook-shaped pivot ears when the traction means is in an operative locked position about a tire.

3. An anti-skid device of the class described comprising a saddle strap, a lever pivotally connected to one end thereof, a yoke pivotally carried by said lever, cam means associated with the yoke, and a traction element connected to the yoke and the opposite end of said saddle strap.

4. A device of the class described comprising a saddle strap having a groove formed along the outer face thereof, a pair of depending spaced parallel ears formed integral with one end of the saddle strap, a lever pivotally mounted between said ears adjacent to the free ends thereof, a yoke pivotally connected to said lever, in such a position that the yoke will not interfere with the movement of the lever to an operative and inoperative position, cam means associated with the yoke, said lever being adapted to be received within the groove formed in said saddle strap, and traction means connected to the yoke and the opposite end of the saddle strap.

5. A device of the class described comprising a saddle strap, a hook adjustably connected to one end thereof, the saddle strap having a groove formed along the outer face thereof, spaced parallel depending ears made integral with the opposite end thereof, an operating lever pivotally mounted between the ears, a yoke pivotally mounted on said lever, cam means carried between the legs of the yoke, one of said cam means being disposed on either side of the lever, said saddle strap having curved cut-out portions for the reception of the cam means when the lever is in an operative position, and traction means connected between said yoke and hook.

In testimony whereof I affix my signature in presence of two witnesses.

VALENTIN F. REJČEK.

Witnesses:
- E. W. KALAR,
  GEORGE LEDNICKY.